United States Patent
Key et al.

(10) Patent No.: US 11,209,525 B2
(45) Date of Patent: Dec. 28, 2021

(54) ON WING TEST OF TRANSPONDER BY ACAS

(71) Applicant: Rockwell Collins, Inc., Cedar Rapids, IA (US)

(72) Inventors: Charles J. Key, West Melbourne, FL (US); Randy H. Jacobson, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 281 days.

(21) Appl. No.: 16/596,601

(22) Filed: Oct. 8, 2019

(65) Prior Publication Data

US 2021/0103025 A1  Apr. 8, 2021

(51) Int. Cl.
  *G01S 13/933* (2020.01)
  *H04B 17/29* (2015.01)
  *G01S 13/75* (2006.01)
  *G01S 7/40* (2006.01)
  *G01S 13/76* (2006.01)

(52) U.S. Cl.
  CPC .............. *G01S 7/40* (2013.01); *G01S 13/767* (2013.01); *G01S 13/933* (2020.01); *H04B 17/29* (2015.01)

(58) Field of Classification Search
  CPC ........ G01S 13/933; G01S 13/767; G01S 7/40; H04B 17/29
  See application file for complete search history.

(56) References Cited

U.S. PATENT DOCUMENTS 4,802,216 A * 1/1989 Irwin ................... G01S 7/4052
                                                                380/2
5,689,266 A * 11/1997 Stelling ................ G01S 7/4004
                                                                342/165
6,240,345 B1 * 5/2001 Vesel .................... G01S 7/4004
                                                                701/29.1
9,923,648 B1 * 3/2018 Jacobson ............. G08G 5/0008
2008/0150792 A1 * 6/2008 Stayton .............. H04B 17/0085
                                                                342/173

FOREIGN PATENT DOCUMENTS

EP  1185880 A2  3/2002

OTHER PUBLICATIONS

Extended Search Report for European Application No. 19216277.4 dated Jul. 21, 2020, 9 pages.
Stamper, Wes, "Understanding mode S technology", Defense Electronics, Dec. 2005, www.rfdesign.com, pp. 18-21.
CFR § 91.413 Appendix F to Part 43—ATC Transponder Tests and Inspections, Title 14, vol. 1, Legal information Institute, 2016, pp. 1026-1027.

* cited by examiner

*Primary Examiner* — Hugo Molina
(74) *Attorney, Agent, or Firm* — Suiter Swantz pc llo

(57) ABSTRACT

A system and method for on-wing test of an aircraft transponder involves configuring a self-test feature to the transponder's corresponding onboard ACAS to verify the onboard transponder system conforms to each of a plurality of required tests of an aviation oversight authority standard for operation. Once this test is initiated, the ACAS initiates this transponder test interrogating the transponder via a low power signal causing the transponder to reply accordingly. The ACAS performs each required test to ensure proper transponder function and alerts a user with a failure indication and stores each result should the transponder fail any of the plurality of tests.

15 Claims, 5 Drawing Sheets

ON WING TEST OF TRANSPONDER BY ACAS

BACKGROUND

Most aircraft operators are required to periodically test each aircraft transponder to ensure that the respective transponder(s) is(are) correctly transmitting at required values for a plurality of parameters.

The required transponder (hereinafter XPDR) tests may be traditionally conducted using a time-consuming bench check or expensive portable test equipment and must meet the requirements prescribed by an oversight authority (e.g. Federal Aviation Administration (FAA)). This manual testing onboard the aircraft or in a lab may result in inefficient resource use and time-consuming testing activities for the operator. Storage of the test equipment in an accessible location and keeping it properly calibrated are additional tasks that must be performed. Personnel assigned to run such a test may not be familiar with the test equipment as this is not part of the normal maintenance operation of an aircraft.

Many of the aircraft requiring the XPDR test are also equipped with an Airborne Collision Avoidance System (ACAS) or a Traffic Collision Avoidance System (TCAS). Within the ACAS, a Traffic Computer may traditionally function to interface with a XPDR onboard another aircraft. The Traffic Computer and onboard XPDR system normally suppress each other during operation to prevent mutual interference. The onboard XPDR normally provides its own Mode S address to the onboard Traffic Computer.

A need remains for a system and related method which may overcome these limitations and provide a novel solution to XPDR testing. Using an ACAS that is already on the aircraft would solve the issues of maintaining separate expensive test equipment that may or may not require removal of the XPDR from the aircraft while still efficiently and successfully evaluating each parameter required by the oversight authority.

SUMMARY

In one aspect, embodiments of the inventive concepts disclosed herein are directed to a system for on-wing test of a transponder (XPDR). In addition to one or more XPDR(s) onboard the aircraft, the system may comprise of an Airborne Collision Avoidance System (ACAS) system onboard an aircraft which includes a Traffic Computer, a pair of antennas connected to the Traffic Computer, and a pair of antennas operatively coupled with the XPDR(s).

As each onboard antenna may perform separate function during normal operations, the Traffic Computer antenna and the XPDR antenna will be separated by some antenna range. The Traffic Computer may also operatively be coupled with a test input and a XPDR fail indication. The system may also include a suppression bus operatively coupled with each of the Traffic Computer and the XPDR(s). The system for on-wing test of a XPDR may further include a tangible, non-transitory memory configured to communicate with the Traffic Computer, the tangible, non-transitory memory having instructions stored therein that, in response to execution by the Traffic Computer, cause the Traffic Computer to perform one or more desired functions of the system for on-wing test of the one or more XPDR(s).

The Traffic Computer may receive and store within the non-transitory memory, a plurality of XPDR system configuration data including a cable loss, the antenna range, and a XPDR class. The non-transitory memory may also store fault data. The Traffic Computer may receive a test command from the test input and disable its use of the suppression bus. Once the suppression bus is disabled, the Traffic Computer may execute a plurality of XPDR tests via a Radio Frequency (RF) interrogation of the XPDR(s).

Here, the plurality of XPDR tests including all of: a radio reply frequency test based on the XPDR class, a suppression test, a receiver sensitivity test including a loss factor for each of the cable loss and the antenna range, a RF peak output power test including the loss factor, a Mode S diversity transmission channel isolation test, a Mode S address test based on the XPDR address, a Mode S format test, a Mode S all-call interrogation test, an Air Traffic Control Radio Beacon System (ATCRBS)-only all-call interrogation test, and a squitter test.

Once the XPDR testing is complete, the Traffic Computer may enable the suppression bus and resume normal operation. The Traffic Computer may also illuminate the XPDR fail indication if the XPDR fails any of the plurality of tests. The Traffic Computer may store all failures in non-transitory fault memory if the XPDR fails any of the plurality of tests.

In an additional aspect of the inventive concepts disclosed herein, a method for on-wing test of a transponder (XPDR) may comprise receiving a plurality of XPDR system configuration data associated with the XPDR including a cable loss, an antenna range, and a XPDR class. The method may include receiving a test command from a test input and disabling a suppression bus.

For accurate and non-intrusive testing, the method may include determining a target interrogation power via an increase in an interrogation power to slightly above a minimum trigger level power.

The method may include executing a plurality of XPDR tests via a Radio Frequency (RF) interrogation of the XPDR at the target interrogation power, the plurality of tests including all of: a radio frequency reply test based on the XPDR class, a suppression test, a receiver sensitivity test including a loss factor for each of the cable loss and the antenna range, the receiver sensitivity test including an minimum trigger level (MTL) test, a Radio Frequency (RF) peak output power test including the loss factor, a Mode S diversity transmission channel isolation test, a Mode S address test based on the XPDR address, a Mode S format test, a Mode S all-call interrogation test, an Air Traffic Control Radio Beacon System (ATCRBS)-only all-call interrogation test, and a squitter test.

Once the XPDR testing is complete, the method may include enabling the suppression bus and illuminating a XPDR fail indication if the XPDR fails any of the plurality of tests. The method may also include storing any failures in non-transitory fault memory.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Reference numerals in the drawings may represent and refer to the same or similar element, feature, or function.

DETAILED DESCRIPTION OF EXEMPLARY EMBODIMENTS

Figure 1:
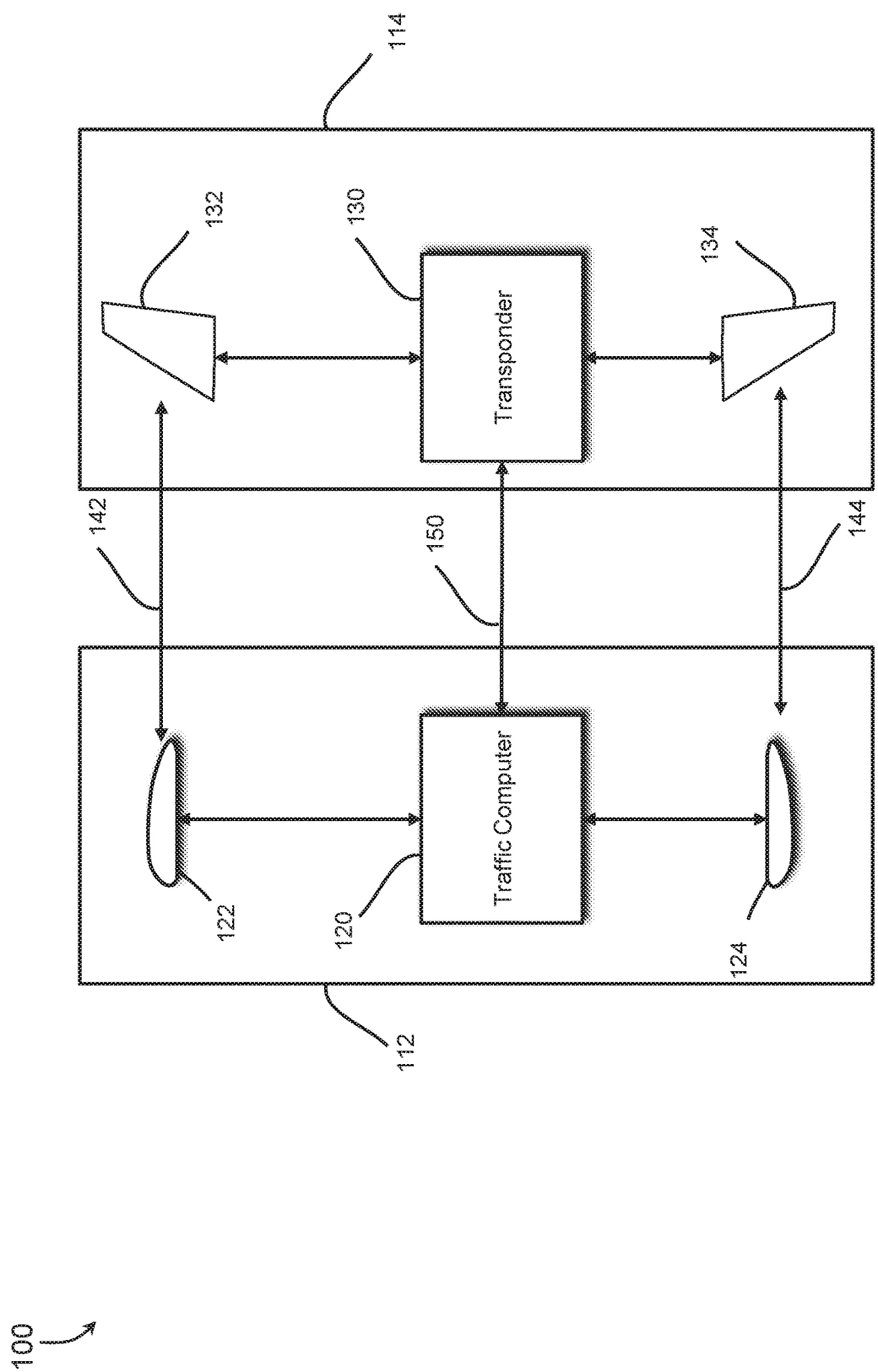
FIG. 1 is a diagram of an exemplary aircraft Traffic Computer and transponder configuration (with corresponding antennas) in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for on-wing test of an aircraft transponder. The system and methods herein involve configuring a self-test feature to the transponder's corresponding onboard ACAS to verify the on-board transponder system conforms to each of a plurality of required tests of an aviation oversight authority standard for operation. Once this test is initiated, the ACAS initiates this transponder test interrogating the transponder via a low power signal causing the transponder to reply accordingly. The ACAS performs each required test to ensure proper transponder function and alerts a user with a failure indication and stores each result should the transponder fail any of the plurality of tests.

| REFERENCE CHART | |
|---|---|
| 100 | ACAS XPDR Configuration |
| 110 | Aircraft |
| 112 | ACAS |
| 114 | XPDR System |
| 120 | Traffic Computer |
| 122 | Traffic Computer Upper Antenna |
| 124 | Traffic Computer Lower Antenna |
| 130 | XPDR |
| 132 | XPDR Upper Antenna |
| 134 | XPDR Lower Antenna |
| 142 | Upper Signal between XPDR and Traffic Computer (bi-directional) |
| 144 | Lower Signal between XPDR and Traffic Computer (bi-directional) |
| 150 | Suppression Bus |
| 200 | Aircraft Antenna Placement |
| 210 | Lower Antenna Range |
| 212 | Upper Antenna Range |
| 212 | Upper Antenna Range |
| 242 | Interrogation Signal (Part of 142) |
| 300 | System for On-Wing XPDR Test |
| 312 | Cable Loss |
| 314 | XPDR Class |
| 324 | Memory |
| 326 | XPDR Test Input |
| 328 | XPDR Fail Indication |
| 342 | XPDR Reply Signal (Part of 142) |
| 400 | Logic Flow |
| 402 | Receive Constants |
| 404 | Receive Test Command |
| 406 | Disable Suppression |
| 408 | Interrogate Low Power |
| 410 | MTL Reached? |
| 412 | Incrementally Increase Power |
| 414 | Slightly Increase Power |
| 416 | Execute Required Tests |
| 418 | Enable Suppression |
| 420 | Any Test Fail? |
| 422 | Resume Normal Operations |
| 424 | Illuminate Failure Indication |
| 426 | Store Failure Results |

-continued

REFERENCE CHART

| | |
|---|---|
| 500 | Method Diagram |
| 502 | Receive XPDR Constants |
| 504 | Receiving a Test Command |
| 506 | Disabling Suppression Bus |
| 508 | Determining Target Interrogation Power |
| 510 | Executing Plurality of Tests |
| 512 | Enabling Suppression Bus |
| 514 | Illuminating XPDR Fail Indication |
| 516 | Storing Failure Results to Memory |

FIG. 1

Referring now to FIG. 1, a diagram of an exemplary aircraft Traffic Computer and transponder configuration (with corresponding antennas) in accordance with an embodiment of the inventive concepts disclosed herein is shown. Generally, an aircraft configuration 100 may include an Airborne Collision Avoidance System (ACAS) 112 and a transponder (XPDR) system 114. The ACAS 112 may include a Traffic Computer 120 operatively coupled with a Traffic Computer upper antenna 122 and a Traffic Computer lower antenna 124 Some configurations may include a single upper or lower antenna depending on the model and size of the aircraft.

As used herein, the term ACAS may refer generally to systems performing airborne collision avoidance direction to a pilot operating the aircraft. In some areas, ACAS is the operative term while in other areas, TCAS may be used as the operative term as a species of ACAS. Advanced systems ACAS II as well as TCAS II may fall directly within the scope of the inventive concepts disclosed herein. The Traffic Computer 120 may be used as the term to describe the core unit performing the collision avoidance algorithms, tracking other aircraft, and presenting this information to the rest of the system.

The XPDR system 114 may include a XPDR 130 operatively coupled with a XPDR upper antenna 132 and a XPDR lower antenna 134 configured for traditional XPDR operations of receiving an interrogation and transmitting a plurality of information via a Radio Frequency (RF) signal. In one embodiment of the inventive concepts disclosed herein, the Traffic Computer and XPDR may communicate via an upper signal 142 and a lower signal 144 (both bidirectional) between each of the upper and lower antennas. In some transport category aircraft, multiple XPDR 130 may be required for certain flight operations.

For accurate operation and so the Traffic Computer 120 and onboard XPDR 130 do not interfere with each other, a suppression bus 150 may operatively couple between the Traffic Computer 120 and XPDR 130 along with additional L-Band equipment. The suppression bus 150 may function to suppress the ACAS function within the Traffic Computer 120 during a XPDR reply to an offboard interrogation. Further, during a Traffic Computer 120 test of the XPDR 130, the Traffic Computer 120 may function to disable the suppression bus 150 and therefore not suppress the XPDR during an onboard interrogation by the Traffic Computer 120.

FIG. 2

Figure 2:
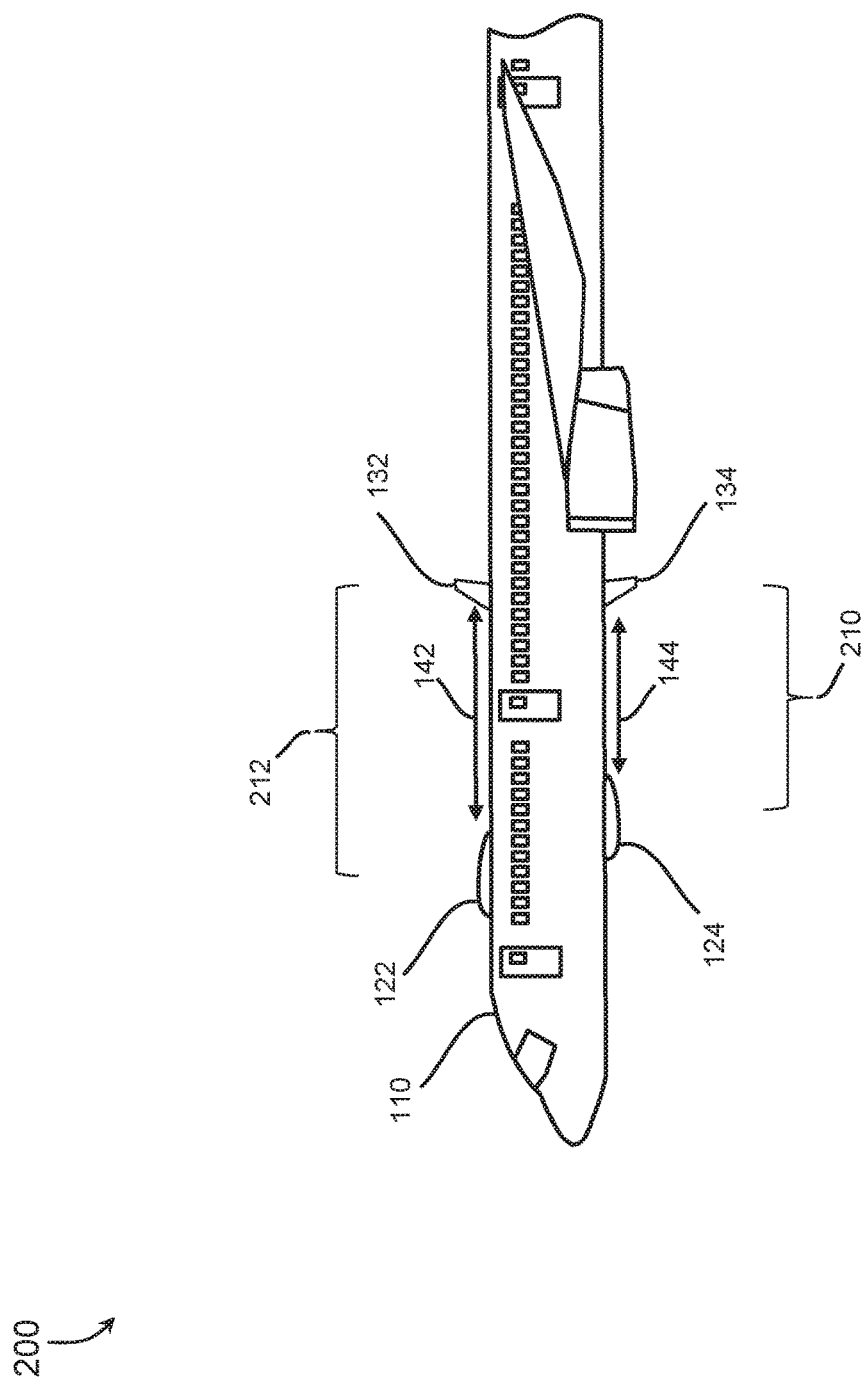
FIG. 2 is a diagram of an exemplary aircraft Traffic Computer and transponder antenna placement in accordance with an embodiment of the inventive concepts disclosed herein.

Referring now to FIG. 2, a diagram of an exemplary aircraft Traffic Computer and transponder antenna placement in accordance with an embodiment of the inventive concepts disclosed herein is shown. An aircraft antenna placement 200 may include, within a transport category aircraft 110, each of the upper 122 132 and lower 124 134 antennas configured generally for transmission and reception of signals above and below the aircraft body. Here, dependent on the aircraft type, a lower antenna range 210 consisting of a measurable distance between each of the lower antennas 124 134 provides antenna separation for accurate signal discrimination. As the lower signal may flow from one antenna to another (e.g., Traffic Computer lower antenna 124 to XPDR lower antenna 134), a resulting loss of power due to RF loss in air may be calculated. Similarly, an upper antenna range 212 causes a loss in air based on the upper signal travel between the upper antenna 122 132 and the resulting loss of power may be calculated.

The systems herein may receive as one variable, the lower antenna range 210 and upper antenna range 212 to determine the air loss as the signals are transmitted and received from one antenna to another.

FIG. 3

Figure 3:
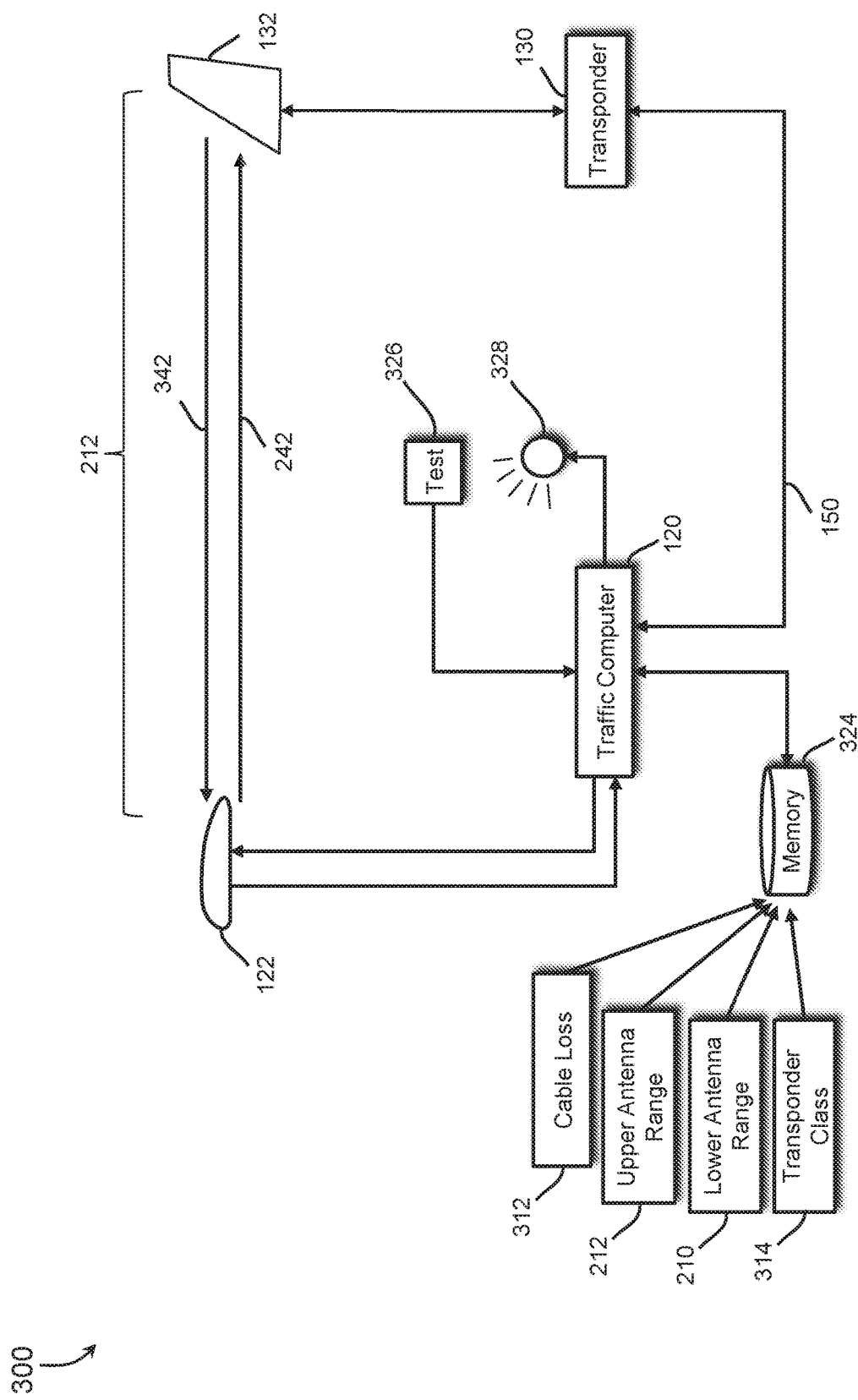
FIG. 3 is a diagram of a system for on-wing test of a transponder exemplary of an embodiment of the inventive concepts disclosed herein.

Referring now to FIG. 3, a diagram of a system for on-wing test of a transponder exemplary of an embodiment of the inventive concepts disclosed herein is shown. The system for on-wing test of the XPDR 300 may function to test each aspect of the XPDR 130 allowing the aircraft operator to remain in compliance with the mandate of the aviation oversight authority.

The Traffic Computer 120 may be configured for traditional ACAS operation as well as each additional function, including the ability to carry out the steps to accurately test the XPDR 130. A tangible, non-transitory memory 324 configured to provide the Traffic Computer the tangible, non-transitory memory having instructions stored therein that, in response to execution by the Traffic Computer, cause the Traffic Computer to carry out the desired function of the system for on-wing test of the XPDR 300 when such a test is commanded.

The Traffic Computer 120 may receive and store system configuration data (e.g., from its own non-volatile memory of from discrete inputs) to accurately interpret each response from the XPDR 130. The system configuration data may include a cable loss 312, the upper 212 and lower 210 antenna ranges from which an air loss may be derived, and a XPDR class 314. Each of these system configuration data may be stored within the memory 324 for use by the Traffic Computer 120.

In one embodiment of the inventive concepts disclosed herein, in order to self-calibrate, the Traffic Computer 120 may send one or more RF test messages to itself. This may allow the Traffic Computer 120 to ensure that it has a record of its own cable delay and cable loss. In one embodiment, the Traffic Computer 120 may measure a power difference of a sent RF test message relative to a power level of a received version of the RF test message.

In one embodiment of the inventive concepts disclosed herein, the Traffic Computer 120 may be configured to receive a variable type of the system configuration data for accurate testing. The Traffic Computer 120 may receive and store a separate configuration file within the memory 324, the system configuration data may be hard coded into the operational software of the Traffic Computer, the system configuration may be strapped via hard wired discretes, or the system configuration data may be received via an auto or manual maintenance personnel aircraft input.

For operation, a test input 326 may receive a physical user input to initiate a test of the transponder system 114. This test interface may be a push button on the unit, it may be separate indication from the aircraft, or it may be coupled with a normal ACAS test indication. A XPDR fail indication 328 may indicate to the user a failure of the test of the XPDR. Also, an analysis of faults stored within memory may indicate to the user a failure of the test of the XPDR.

Under normal operation, a traditional test function of the ACAS system may test the function and operation of the Traffic Computer 120 and its interfaces to the rest of the ACAS system. It is not expected that a test of the XPDR system would be performed as part of a preflight check as is the case with the traditional ACAS test. A method for initiating the XPDR test may include a special test input, an extended test input, or multiple test inputs. Contemplated herein, the user may press the ACAS test button for an extended period to enable the Traffic Computer 120 to enter the XPDR test mode of operation. For example, a normal ACAS test may result from a one second depression of the test button. Here, a press of the test button of a longer duration (e.g., >8 seconds) may cause the Traffic Computer 120 to enter the XPDR test mode of operation.

In one embodiment of the inventive concepts disclosed herein, the Traffic Computer 120 may include a XPDR fail indication 328 including a light conspicuously viewable by a user and a XPDR fail annunciation command sent via a crew alerting system to a cockpit display.

The cable loss 312 may include a cable loss between the Traffic Computer 120 and each (upper and lower) Traffic Computer antenna 122 124. As previously stated, this may also be determined automatically by the Traffic Computer through self-calibration. Also, the cable loss 312 may include a cable loss between the XPDR 130 and each XPDR (upper and lower) antenna. For example, one XPDR test may include the Traffic Computer upper antenna 122 and the XPDR upper antenna 132. Here, the total loss variable useable by the Traffic Computer 120 may include a cable loss from the Traffic Computer 120 to the Traffic Computer upper antenna 122, an air loss including the upper antenna range 212 between the Traffic Computer upper antenna 122 and the XPDR upper antenna 132, and a cable loss between the XPDR upper antenna 132 and the XPDR 130.

To communicate with the XPDR 130, the Traffic Computer 120 may initiate an RF interrogation signal 242 sent from the Traffic Computer 120 to the XPDR 130 via the Traffic Computer antenna (here upper 122) which may cause the XPDR 130 to reply to the Traffic Computer 120 via a XPDR reply signal 342. In this situation, the XPDR 130 will reply to the onboard Traffic Computer 120 since the suppression bus 150 is not active.

In function, the Traffic Computer 120 may receive and store within the memory 324, a plurality of XPDR system configuration data including the cable loss 312, the lower 210 and upper 212 antenna ranges, and a XPDR class 314. The Traffic Computer 120 may wait for and receive a test command from the test input 326.

In one embodiment of the inventive concepts disclosed herein, once the suppression bus 150 is disabled, the Traffic Computer 120 may execute a plurality of XPDR tests via an RF interrogation of the XPDR 130. To comply with the oversight authority, the plurality of tests include all of: a radio reply frequency test based on the XPDR class, a suppression test, a receiver sensitivity test including a loss factor for each of the cable loss and the antenna range, a RF peak output power test including the loss factor, a Mode S diversity transmission channel isolation test, a Mode S address test based on the XPDR address, a Mode S format test, a Mode S all-call interrogation test, an Air Traffic Control Radio Beacon System (ATCRBS)-only all-call interrogation test, and a squitter test.

Once the tests are complete, the Traffic Computer 120 may enable the suppression bus 150, and, if each test passes, take no further action and resume normal operations. However, should any of the tests fail, the Traffic Computer 120 may illuminate the XPDR fail indication 328 (e.g., fail light) and store each failure event within the memory 324. In some embodiments, the Traffic Computer 120 may communicate the XPDR fail indication with at least one onboard system.

US Jurisdiction Requirements

In one embodiment of the inventive concepts disclosed herein, the system for on-wing test of the XPDR 300 may accurately test the XPDR 130 for operation. In compliance with a local oversight authority periodic testing requirement, the system for on-wing test of the XPDR 300 may be commanded to periodically perform each test. In one such jurisdiction, the US statute which mandates the testing frequency and specific values for each test may be found in CFR §§ 91.413 Appendix F to Part 43—ATC Transponder Tests and Inspections which is incorporated herein by reference in its entirety. Further, the US statute which directs XPDR 130 testing may include 14 CFR §§ 91.413—ATC transponder tests and inspections which is also incorporated herein by reference in its entirety.

Appendix F to Part 43 directs a test of each of the aspects of XPDR 130 including:
 a) A Radio Reply Frequency test;
 b) A Suppression test;
 c) A Receiver Sensitivity test; and
 d) A Radio Frequency (RF) Peak Output Power test.

The tests in (e) through (j) apply only to Mode S transponders:
 e) A Mode S Diversity Transmission Channel Isolation test;
 f) A Mode S Address test;
 g) A Mode S Formats test;
 h) A Mode S All-Call Interrogations test;
 i) An ATCRBS-Only All-Call Interrogation test; and
 j) A Squitter test.

Sensitivity Test

To reduce a possibility of interfering with other aircraft and the XPDR system thereon, the system for on-wing test of the XPDR 300 may determine a desired power output of the ACAS interrogation signal 242. In one embodiment of the inventive concepts disclosed herein, the receiver sensitivity test is completed first and comprises an increase in a first power level of the RF interrogation until a minimum triggering level (MTL) of the XPDR 130 is reached, and each subsequent RF interrogation within the ACAS interrogation signal 242 is at a second (target) power level slightly greater than the first power level that reached the MTL.

For example, the Traffic Computer 120 may begin the XPDR test at a low power setting to determine the MTL of the transponder. Once the Traffic Computer 120 determines the MTL, it may raise the power level of the ACAS interrogation signal 242 approximately 0.5 dB above the MTL. In this manner, the system for on-wing test of the XPDR 300 may successfully interrogate the XPDR 130 but send a low enough power signal to not reach an MTL of a nearby XPDR onboard a nearby aircraft.

The receiver sensitivity test may also include an RF interrogation and a verification that the receiver MTL is between approximately −69 and −77 dBm, and a verification that a difference between a Mode 3/A receiver sensitivity and a Mode C receiver sensitivity does not exceed approximately one (1) dB. For example, once the Traffic Computer 120 determines the MTL is, for example, −76 dBm, the Traffic Computer may increase the power of the ACAS interrogation signal 242 to −75.5 dBm to accomplish the remaining tests.

Radio Reply

The Traffic Computer 120 may perform the radio reply frequency test by an RF interrogation of the XPDR 130 and a verification that a reply frequency is, based on the XPDR class, either 1090±3 Megahertz (MHz), or more accurately 1090±1 MHz. As a plurality of classes of transponders may be in operation, the Traffic Computer 120 may be configured to accurately test the specific class of the on-board XPDR 130. If the on-board transponder 130 is one of classes 1B, 2B, or 3B that may incorporate an optional 1090±1 MHz reply frequency or of classes 1A, 2A, 3A, and 4, the Traffic Computer 120 may interrogate the transponder and verify that the reply frequency is 1090±1 MHz. For all other classes of transponder, the Traffic Computer 120 may interrogate the XPDR 130 and verify that the reply frequency is 1090±3 MHz. Further, if there are multiple on-board transponders, the XPDR test may independently test each on-board XPDR with respect to the on-board XPDR's respective class.

Suppression

One or more XPDRs 130 may respond to a plurality of interrogation pulses of variable amplitude based on the mode interrogated (3/A or C). To accomplish the suppression test, the Traffic Computer 120 may interrogate the XPDR 130 at a rate of between approximately 230 and 1,200 interrogations per second (IPS) and verify the XPDR 130 does not reply to more than one percent of interrogations when an amplitude of a P2 pulse is equal to an amplitude of a P1 pulse. The Traffic Computer 120 may further verify that the XPDR does reply to at least 90 percent of interrogations when the amplitude of the P2 pulse is (9) nine dB less than the amplitude of the P1 pulse.

Peak Output Power

In testing the RF peak output power of the XPDR 130, the Traffic Computer 120 may interrogate and verify the XPDR RF output power of the XPDR reply signal 342 is, based on the XPDR class, a minimum of 21.0 dBw (125 watts) or 18.5 dBw (70 watts). Also, the Traffic Computer 120 may verify that the maximum power of the XPDR reply signal 342 does not exceed 27.0 dBw (500 watts).

Based on the class of XPDR 130, the Traffic Computer 120 may verify that the transponder RF output power is within specifications for the class of transponder. The Traffic Computer 120 may verify the minimum RF peak output power of the XPDR 130 may be 21.0 dBw (125 watts) for classes 1A, 2A, ATCRBS XPDRs, and classes 1A, 2A, 3A, and 4 and those Class 1B, 2B, and 3B Mode S transponders that include the optional high RF peak output power. Conversely, the Traffic Computer 120 may verify the minimum RF peak output power of the XPDR 130 may be 18.5 dBw (70 watts) for XPDR of classes 1B and 2B ATCRBS.

Mode S Antenna Diversity

In one embodiment of the inventive concepts disclosed herein, the Traffic Computer 120 may select the upper antenna 122 132 for execution of the XPDR test or the lower antenna 124 134 or a combination thereof. In testing antenna diversity, the Traffic Computer 120 may interrogate a Mode S XPDR 130 to determine the Diversity Transmission Channel Isolation. Here, the Traffic Computer 120 may verify that an RF peak output power transmitted from a selected antenna (upper 132 or lower 134) exceeds an RF peak output power transmitted from a non-selected antenna by at least approximately 20 db.

Mode S Address

In one embodiment of the inventive concepts disclosed herein, the Traffic Computer 120 may function to test a correct reply to the XPDR address, which is provided to the ACAS system by the XPDR. The Traffic Computer 120 may interrogate the XPDR 130 at a nominal rate of 50 IPS using the XPDR address and at least two incorrect XPDR addresses and verify that the XPDR 130 replies only to the XPDR address. In this manner, the Traffic Computer 120 may test and verify the XPDR 130 responds only to the correct XPDR address.

Mode S Formats

The XPDR reply must be correctly formatted for accurate reception by the offboard interrogation to verify an altitude match and an identity match. The Traffic Computer 120 may interrogate the Mode S XPDR 130 with uplink formats (UF) for which the XPDR 130 is equipped and verify that the XPDR reply signal 342 is in the correct format. The Traffic Computer 120 may use a surveillance format UF=4 and 5 to interrogate and verify that the altitude reported in the XPDR reply signal 342 to UF=4 is the same as that reported in a valid ATCRBS Mode C reply. The Traffic Computer 120 may further verify that an identity reported in the replies to UF=5 is the same as that reported in a valid ATCRBS Mode 3/A reply. Based on the XPDR class 314, the Traffic Computer 120 may interrogate using communication formats UF=20, UF=21, and UF=24.

All Call

To identify an aircraft, a ground-based interrogation from air traffic control (ATC) may include an all call interrogation. The Traffic Computer 120 may interrogate the XPDR 130 in a Mode S-only all-call format (UF11) and an ATCRBS/Mode S all-call format and verify that the XPDR reply signal 342 is in a downlink format (DF) 11 and includes the XPDR address and a communication capability of the XPDR.

Here, the ATCRBS/Mode S all-call format may include a 1.6 microsecond P4 pulse and the reported capability of the XPDR 130 may include a mode capability (e.g. Mode A, Mode C, Mode S).

The Traffic Computer 120 may further test the XPDR 130 ensuring it does not reply to an incorrect interrogation. The Traffic Computer 120 may interrogate the Mode S XPDR 130 in a two-pulse format including a P1 pulse and a P3 pulse, and verify that the Mode S XPDR 130 generates no reply.

Squitter

In one embodiment of the inventive concepts disclosed herein, the Traffic Computer 120 may test the squitter transmission of the Mode S XPDR 130. Here, the Traffic Computer 120 may receive a DF11 squitter transmission approximately once per second from the XPDR 130 on alternating antennas.

The squitter test may include a DF11 message, or all-call reply, including an airframe address (squitter address) as well as a capability (CA) field, a parity/interrogator identifier (PI) field, an interrogator identifier (II) and a surveillance identifier (SI). The CA field may comprise a three-bit word containing the communication capabilities of the XPDR 130. The PI field is a 24-bit word that may report the interrogator identification code with a parity overlay. The II field is a four-bit word, from 0 to 15, containing an identification code of the interrogator. The SI field may be a six-bit word, from 0 to 63, used to identify a type of surveillance.

Additional Tests

The Traffic Computer 120 may also extract/report information from the XPDR 130 to ensure that all applicable data is available. Information the Traffic Computer 120 may extract includes a Mode A Code, a pressure altitude, an aircraft identification, a data link capability report, an IDENT/special purpose identification (SPI) indication, a mode control panel (MCP)/flight control unit (FCU) selected altitude, a roll angle, a true track angle, a ground speed, a magnetic heading, an indicated airspeed, a Mach, a vertical rate, a barometric pressure setting, a track angle rate, and a true airspeed. As much of this data is variable, a report of this data may be made to maintenance personnel in order to ensure that it was correct for a current state of the aircraft.

The Traffic Computer may also record and report information that is transmitted by the transponder on an ADS-B out squitter. This recording of data may include: the aircraft identification, the Mode A Code, an air/ground state, a latitude/longitude, a position integrity and accuracy, a source integrity, a system design assurance, a pressure altitude, the IDENT/SPI indication, an emergency status and indication, a 1090 ES version number, a velocity, a velocity accuracy, an emitter category, a vertical rate, a ground track and ground speed, a length/width of the aircraft, a GPS antenna offset, a geometric altitude, a geometric altitude quality, a selected altitude, and a barometric pressure setting. As much of this data is also variable, a report of this data may be made to maintenance personnel in order to ensure that it was correct for a current state of the aircraft.

FIG. 4

Figure 4:
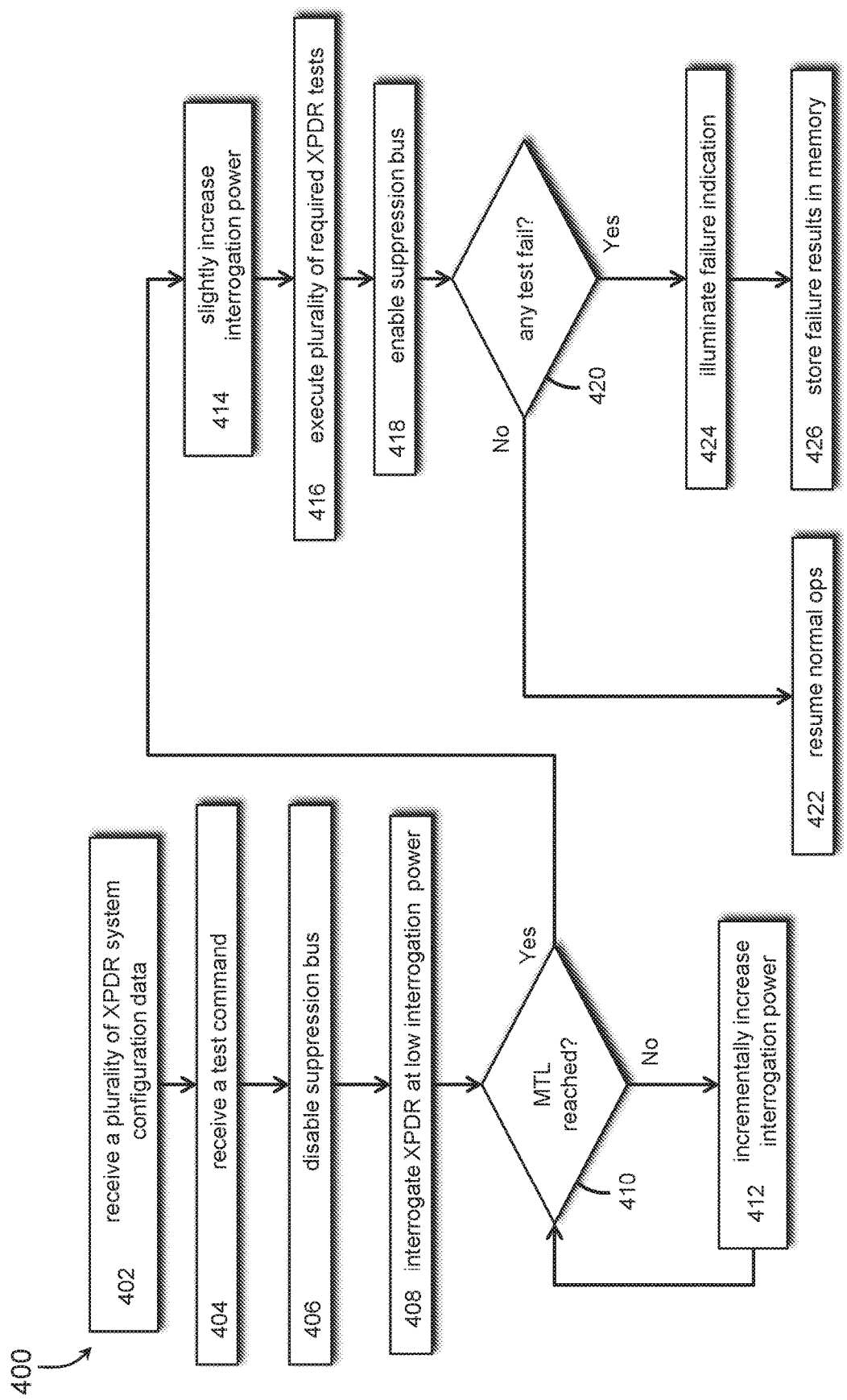
FIG. 4 is a diagram of a logic flow exemplary of one embodiment of the inventive concepts disclosed herein.

Referring now to FIG. 4, a diagram of a logic flow exemplary of one embodiment of the inventive concepts disclosed herein is shown. A logic flow 400 for the system for on-wing test of the XPDR 300 may indicate one flow of logic the Traffic Computer 120 may use for testing the XPDR 130. A step 402 may include receiving a plurality of XPDR system configuration data associated with the XPDR 130 including a cable loss, an antenna range, and a XPDR class while a step 404 may include receiving a test command from a test input. A step 406 may disable the suppression bus 150 for accurate reception of the XPDR reply signal 342.

To determine the desired power level with which to test the XPDR 130, the Traffic Computer 120 may, at a step 408, interrogate the XPDR 130 at a low interrogation power and listen for a reply to determine if the XPDR MTL has been reached. The logic may then pass to a query 410 to determine if the MTL has been achieved. If the result of query 410 is negative, the logic may pass to a step 412 to incrementally increase the interrogation power and listen again. The preceding logic continues until the MTL is reached. Should the MTL be reached and the result of query 410 be positive, the logic may pass to a step 414 to increase an interrogation power slightly above the MTL power level. This increase may result in the target interrogation power level for accurate and non-intrusive self-testing.

For example, should the Traffic Computer 120 interrogate the XPDR 130 and find the MTL at an exemplary −74 dBm, the Traffic Computer 120 may then raise the power level of interrogation to −73.5 dBm to remain below a power level which may cause XPDRs on nearby aircraft to respond.

At a step 416, the system for on-wing test of the XPDR 300 may execute a plurality of tests via the RF interrogation of the XPDR 130 at the target interrogation power, the plurality of tests including all of: a radio frequency reply test based on the XPDR class, a suppression test, a receiver sensitivity test including a loss factor for each of the cable loss and the antenna range, a Radio Frequency (RF) peak output power test including the loss factor, a Mode S diversity transmission channel isolation test, a Mode S address test based on the XPDR address, a Mode S format test, a Mode S all-call interrogation test, an Air Traffic Control Radio Beacon System (ATCRBS)-only all-call interrogation test, and a squitter test.

Once the testing is complete, the logic may pass to a step 418 which enables the suppression bus 150. Query 420 may then question if any of the tests has failed. Should a result be negative, the logic may pass to a step 422 of resuming normal operations. However, should a result of query 420 be positive, the logic may pass to a step 424 with illuminating a XPDR fail indication if the XPDR 130 may have failed any of the plurality of tests and, at a step 424 storing each failure event within the memory 324.

FIG. 5

Figure 5:
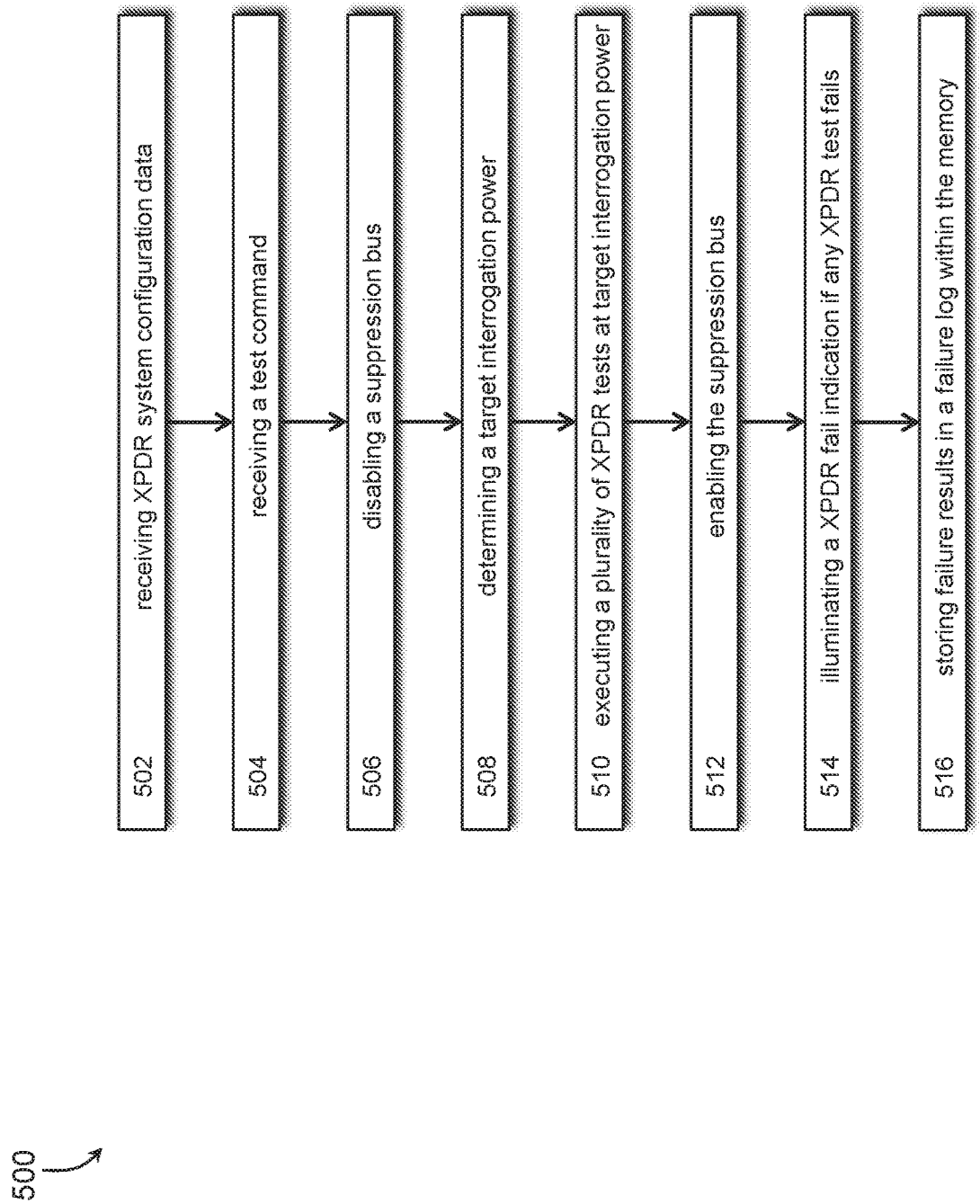
FIG. 5 is a diagram of a method flow in accordance with one embodiment of the inventive concepts disclosed herein.

Referring now to FIG. 5, a diagram of a method flow in accordance with one embodiment of the inventive concepts disclosed herein is shown. A method flow 500 may include steps the Traffic Computer 120 may take to accomplish each of the plurality of tests of the XPDR 130. The method flow 500 may include, at a step 502, receiving a plurality of XPDR constants associated with the at least one XPDR including at least one of: a cable loss, an antenna range, and a XPDR class. A step 504 may include receiving a test command from a XPDR test input and a step 506 may include disabling a suppression bus. To determine a correct and minimum power for interrogation, a step 508 may include determining a target interrogation power via an increase in an interrogation power to slightly above a minimum trigger level power.

To comply with a XPDR testing requirement, a step 510 may include executing a plurality of tests via at least one Radio Frequency (RF) interrogation of at least one XPDR at the target interrogation power, the plurality of tests including all of: a radio frequency reply test based on the XPDR class, a suppression test, a receiver sensitivity test including a loss factor for each of the cable loss and the antenna range, a Radio Frequency (RF) peak output power test including the loss factor, a Mode S diversity transmission channel isolation test, a Mode S address test based on the XPDR address, a Mode S format test, a Mode S all-call interrogation test, an Air Traffic Control Radio Beacon System (ATCRBS)-only all-call interrogation test, and a squitter test.

Returning the XPDR to an operational status, a step 512 may include enabling the suppression bus. Should any of the XPDR tests fail, a step 514 may include illuminating a XPDR fail indication if the at least one XPDR fails any of the plurality of tests and a step 516 may include storing each failure result within a failure log within the fault memory.

CONCLUSION

As will be appreciated from the above description, embodiments of the inventive concepts disclosed herein may provide a novel solution to XPDR testing. Using an ACAS that is already on the aircraft would solve the issues of maintaining separate expensive test equipment that may or may not require removal of the XPDR from the aircraft while still efficiently and successfully evaluating each parameter required by the oversight authority.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for on-wing test of a transponder (XPDR), comprising:
    an Airborne Collision Avoidance System (ACAS) onboard an aircraft, the ACAS including a Traffic Computer, at least one Traffic Computer antenna, and a XPDR fail indication;
    at least one XPDR onboard the aircraft, the at least one XPDR operatively coupled with at least one XPDR antenna;
    the at least one traffic computer antenna and the at least one XPDR antenna separated by at least one antenna range;
    a test input coupled with the Traffic Computer, the test input configured for enabling a test of the at least one XPDR;
    the Traffic Computer and the at least one XPDR each operatively coupled with a suppression bus;
    the Traffic Computer including a tangible, non-transitory memory operatively coupled with the Traffic Computer and configured to provide the Traffic Computer with a plurality of XPDR system configuration data including at least one of a cable loss, the at least one antenna range, and a XPDR class, the tangible, non-transitory memory having instructions stored therein that, in response to execution by the Traffic Computer, cause the Traffic Computer to:
        receive a test command from the test input to enable the test of the at least one XPDR;
        disable the suppression bus;
        execute the test of the at least one XPDR, including a plurality of XPDR tests via at least one Radio Frequency (RF) interrogation of the at least one XPDR, the plurality of tests including all of: a radio reply frequency test based on the XPDR class, a suppression test, a receiver sensitivity test including a loss factor for each of the cable loss and the at least one antenna range, a RF peak output power test including the loss factor, a Mode S diversity transmission channel isolation test, a Mode S address test based on a XPDR address, a Mode S format test, a Mode S all-call interrogation test, an Air Traffic Control Radio Beacon System (ATCRBS)-only all-call interrogation test, and a squitter test;
        re-enable the suppression bus; and
        illuminate the XPDR fail indication and store failures in fault memory if at least one of the plurality of tests fails.

2. The system for on-wing test of a transponder of claim 1, wherein the receiver sensitivity test further comprises the at least one RF interrogation and a verification that a receiver minimum triggering level (MTL) is between approximately −69 and −77 dBm, and a verification that a difference between a Mode 3/A receiver sensitivity and a Mode C receiver sensitivity does not exceed approximately one (1) dB.

3. The system for on-wing test of a transponder of claim 2, wherein the receiver sensitivity test is completed first and comprises an increase in a first power level of the at least one RF interrogation until the MTL is reached, and each subsequent of the at least one RF interrogation is at a second power level slightly greater than the first power level that reached the MTL.

4. The system for on-wing test of a transponder of claim 1, wherein the radio reply frequency test further comprises the at least one RF interrogation of the at least one XPDR and a verification that a reply frequency is, based on the XPDR class, at least one of: 1090±3 Megahertz (MHz), and 1090±1 MHz.

5. The system for on-wing test of a transponder of claim 1, wherein the suppression test further comprises the at least one RF interrogation of between approximately 230 and 1,200 interrogations per second (IPS) and a verification that the at least one XPDR does not reply to more than one percent of interrogations when an amplitude of a P2 pulse is equal to an amplitude of a P1 pulse, and a verification that the at least one XPDR does reply to at least 90 percent of interrogations when the amplitude of the P2 pulse is (9) nine dB less than the amplitude of the P1 pulse.

6. The system for on-wing test of a transponder of claim 1, wherein the RF peak output power test further comprises the at least one RF interrogation and a verification that a XPDR RF peak output power is, based on the XPDR class, a minimum of one of: 21.0 dBw (125 watts) and 18.5 dBw (70 watts), and the XPDR RF peak output power does not exceed 27.0 dBw (500 watts).

7. The system for on-wing test of a transponder of claim 1, wherein the Mode S Diversity Transmission Channel Isolation test further comprises at least one RF interrogation and a verification that an RF peak output power transmitted from a selected antenna exceeds an RF peak output power transmitted from a non-selected antenna by at least approximately 20 db.

8. The system for on-wing test of a transponder of claim 1, wherein the Mode S Address test further comprises the at least one RF interrogation at a nominal rate of 50 IPS using the XPDR address and at least two incorrect XPDR addresses and a verification that the at least one XPDR replies only to the XPDR address.

9. The system for on-wing test of a transponder of claim 1, wherein the Mode S Formats test further comprises an applicable interrogation of the at least one RF interrogation, the applicable interrogation based on the XPDR class, of an uplink format (UF) of: a UF4 including a verification that a UF4 XPDR altitude reply matches a Mode C XPDR altitude reply, a UF5 including a verification than an identity reported in a UF5 reply matches an identity reported in a Mode 3/A reply, a UF20, a UF21, and a UF24.

10. The system for on-wing test of a transponder of claim 1, wherein the Mode S all-call interrogation test further comprises the at least one RF interrogation in a Mode S-only all-call format (UF11) and a verification that the at least one XPDR reply is in a downlink format (DF) 11 and includes at least one of: the XPDR address and a communication capability of the at least one XPDR.

11. The system for on-wing test of a transponder of claim 1, wherein the ATCRBS-only all-call interrogation test further comprises the at least one RF interrogation of a Mode S XPDR in a two-pulse format including a P1 and a P3, and a verification that the Mode S XPDR generates no reply.

12. The system for on-wing test of a transponder of claim 1, wherein the squitter test further comprises a reception of a DF11 squitter approximately once per second from an active XPDR of the at least one XPDR, and through alternating antennas if the aircraft includes two XPDR antennas.

13. The system for on-wing test of a transponder of claim 1, wherein the XPDR fail indication is at least one of a XPDR fail light and a XPDR fail annunciation and further includes one of: storage of the XPDR fail indication within the memory and a communication of the XPDR fail indication with at least one onboard system.

14. A method for on-wing test of at least one transponder (XPDR), comprising:
   receiving a plurality of configuration data associated with the at least one XPDR including at least one of: a cable loss, at least one antenna range, and a XPDR class;
   receiving a test command from a test input;
   disabling a suppression bus;
   determining a target interrogation power via an increase in an interrogation power to slightly above a minimum trigger level power;
   executing a plurality of XPDR tests via at least one Radio Frequency (RF) interrogation of the at least one XPDR at the target interrogation power, the plurality of tests including all of: a radio frequency reply test based on the XPDR class, a suppression test, a receiver sensitivity test including a loss factor for each of the cable loss and the at least one antenna range, the receiver sensitivity test including an MTL test, a Radio Frequency (RF) peak output power test including the loss factor, a Mode S diversity transmission channel isolation test, a Mode S address test based on a XPDR address, a Mode S format test, a Mode S all-call interrogation test, an Air Traffic Control Radio Beacon System (ATCRBS)-only all-call interrogation test, and a squitter test;
   enabling the suppression bus; and
   illuminating a XPDR fail indication and logging failures to fault memory if the at least one of the plurality of tests fails.

15. The method for on-wing test of at least one transponder of claim 14, wherein executing a plurality of tests of the at least one XPDR is in compliance with a local oversight authority periodic testing requirement.

* * * * *